S. I. FEKETE AND S. G. BAITS.
MOTOR VEHICLE.
APPLICATION FILED JULY 2, 1920.

1,380,097. Patented May 31, 1921.

INVENTORS:
Stephen I. Fekete
Stuart G. Baits by Macleod, Calver, Copeland & Dike
Attys.

UNITED STATES PATENT OFFICE.

STEPHEN I. FEKETE AND STUART G. BAITS, OF DETROIT, MICHIGAN, ASSIGNORS TO ESSEX MOTORS, OF DETROIT, MICHIGAN, A CORPORATION OF MICHIGAN.

MOTOR-VEHICLE.

1,380,097.   Specification of Letters Patent.   Patented May 31, 1921.

Application filed July 2, 1920. Serial No. 393,481.

*To all whom it may concern:*

Be it known that we, STEPHEN I. FEKETE, a subject of the King of Hungary, and STUART G. BAITS, a citizen of the United States, both residing at Detroit, county of Wayne, State of Michigan, have invented a certain new and useful Improvement in Motor-Vehicles, of which the following is a specification, reference being had therein to the accompanying drawings.

Our invention has for its object a new and improved combination and arrangement of the essential groups of mechanisms required in a motor vehicle, the particular object of the invention being to reduce the cost of manufacture of such vehicles and to provide a design especially suitable for use in very small, cheap cars.

Generally speaking the invention consists in mounting a casing on the axle, which may be either the rear or front axle according as the vehicle is to have a front drive or a rear drive, and inclosing within this casing the crank shaft of the engine, the friction clutch, change speed gear and reduction gearing, the cylinder or cylinders of the engine being mounted on or cast integral with said casing. A single compact driving unit surrounding the axle results. This is extremely economical to manufacture as certain parts commonly used in motor vehicles may be omitted altogether, some of these parts being the propeller shaft, universal joints and separate crank casing and transmission housing. All the advantages of the type of vehicle which includes a friction clutch and change speed gearing are retained.

The invention will be fully understood from the following description when taken in connection with the accompanying drawings, and the novel features will be pointed out and clearly defined in the claims at the close of this specification.

Figure 1:
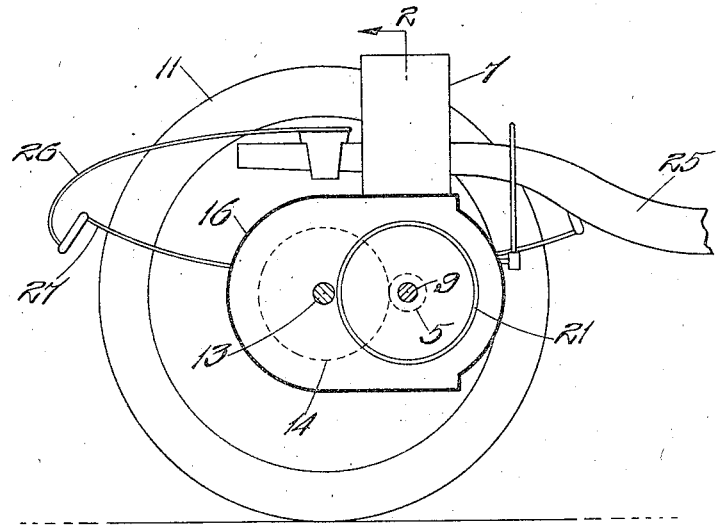

In the drawings, Figure 1 is a side elevation partly in section of a driving unit of a motor vehicle embodying the invention.

Figure 2:
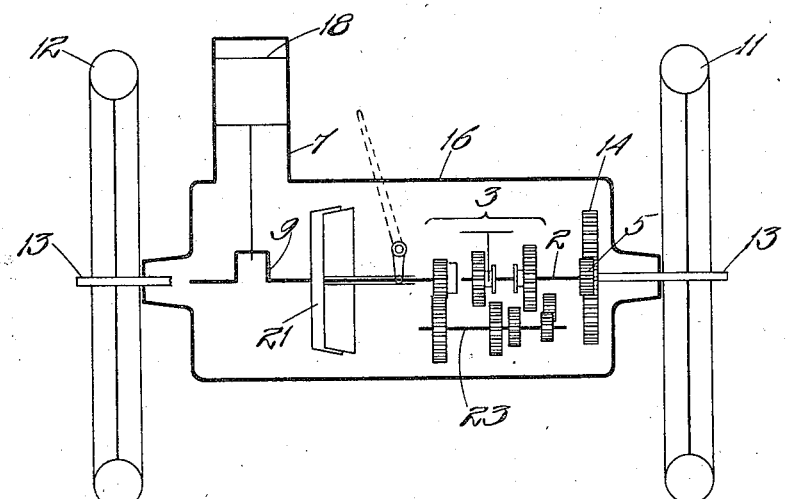

Fig. 2 is a section in the form of a diagram taken on line 2—2 of Fig. 1.

Referring now to the drawings, at 11 and 12 are shown the wheels of the vehicle. At 13 is shown an axle connecting the two wheels. On this axle is mounted a gear wheel 14 which with the pinion 5 forms the reduction gear. At 16 is shown a housing surrounding the axle 13 and containing all the working parts of the driving unit of the vehicle. An engine cylinder is shown at 7, but it will be understood that cylinders may vary in number according to the type of engine and the purpose for which it is to be used. We have shown a single cylinder merely for purposes of illustration. The piston is indicated at 18 and operates a crank axle 9 in line with the main shaft 2 on which the reduction pinion 5 is mounted. Adjacent the cranked axle 9 is a friction clutch 21 of any convenient type, as for instance a cone clutch. Between the clutch 21 and the reduction pinion 5 is located a change speed gear or transmission 3, preferably of the sliding gear type. In the drawings, we have shown a change speed gear having three speeds forward and one on reverse, the countershaft 23 of said transmission being located beneath the main shaft 2 thereof. Power from the engine is transmitted through the crank shaft 9, clutch 21, transmission 3, main shaft 2, and reduction gearing 5, 14 to the rear axle of the vehicle, the speed being capable of variation by changing the several combinations of gears in the transmission in the well-known manner.

The parts make up a driving unit which may be employed either at the front or at the rear of the vehicle. In Fig. 1 we have shown the driving unit placed at the rear of the vehicle, the frame being designated 25 and the springs 26 and 27.

What we claim is:—

1. The improved motor vehicle having a pair of wheels, an axle, a casing for said axle, an engine mounted on said casing, a crankshaft for the engine in said casing parallel with the axle, and a sliding gear change speed gearing operatively connecting said axle and said crankshaft.

2. The improved motor vehicle having a pair of wheels, a driving axle, a casing for said axle, an engine mounted on said casing, a crankshaft for the engine in said casing parallel with the driving axle, a change speed gearing in said casing and having a main shaft in line with said crankshaft, and a reduction gearing operatively connecting the said main shaft and the said driving axle.

3. The improved motor vehicle having a pair of wheels, a driving axle, a casing for said axle, an engine mounted on said casing, a crankshaft for the engine in said casing parallel with the driving axle, a change speed gearing in said casing and having a main shaft in line with said crankshaft, a friction clutch between the engine and the change speed gearing, and a reduction gearing operatively connecting the said main shaft and the said driving axle.

4. The improved motor vehicle having a pair of wheels, a driving axle, an axle casing, an engine mounted on said casing, a crankshaft for the engine parallel with the driving axle, a sliding-gear change speed gearing with its main shaft in line with the crankshaft and its countershaft below said main shaft, a friction clutch between the main shaft and the crankshaft, a small reduction gear on the main shaft and a large reduction gear on the driving axle, all of said parts except the engine being inclosed in said axle casing.

5. The improved motor vehicle having a pair of wheels, an axle, a casing for said axle, an engine mounted on said casing, a crankshaft for the engine in said casing parallel with the axle, reduction gearing operatively connecting said axle and crankshaft, and a friction clutch interposed in the connections between said axle and crankshaft.

6. The improved motor vehicle having a pair of wheels, an axle, a casing for said axle, an engine mounted on said casing, a crankshaft for the engine parallel with the axle, a sliding gear change speed gearing operatively connecting said axle and crankshaft, and a friction clutch interposed in the connections between said axle and crankshaft, all of said parts except the engine being inclosed in said axle casing.

In testimony whereof we affix our signatures.

STEPHEN I. FEKETE.
STUART G. BAITS.